United States Patent Office 2,722,846
Patented Nov. 8, 1955

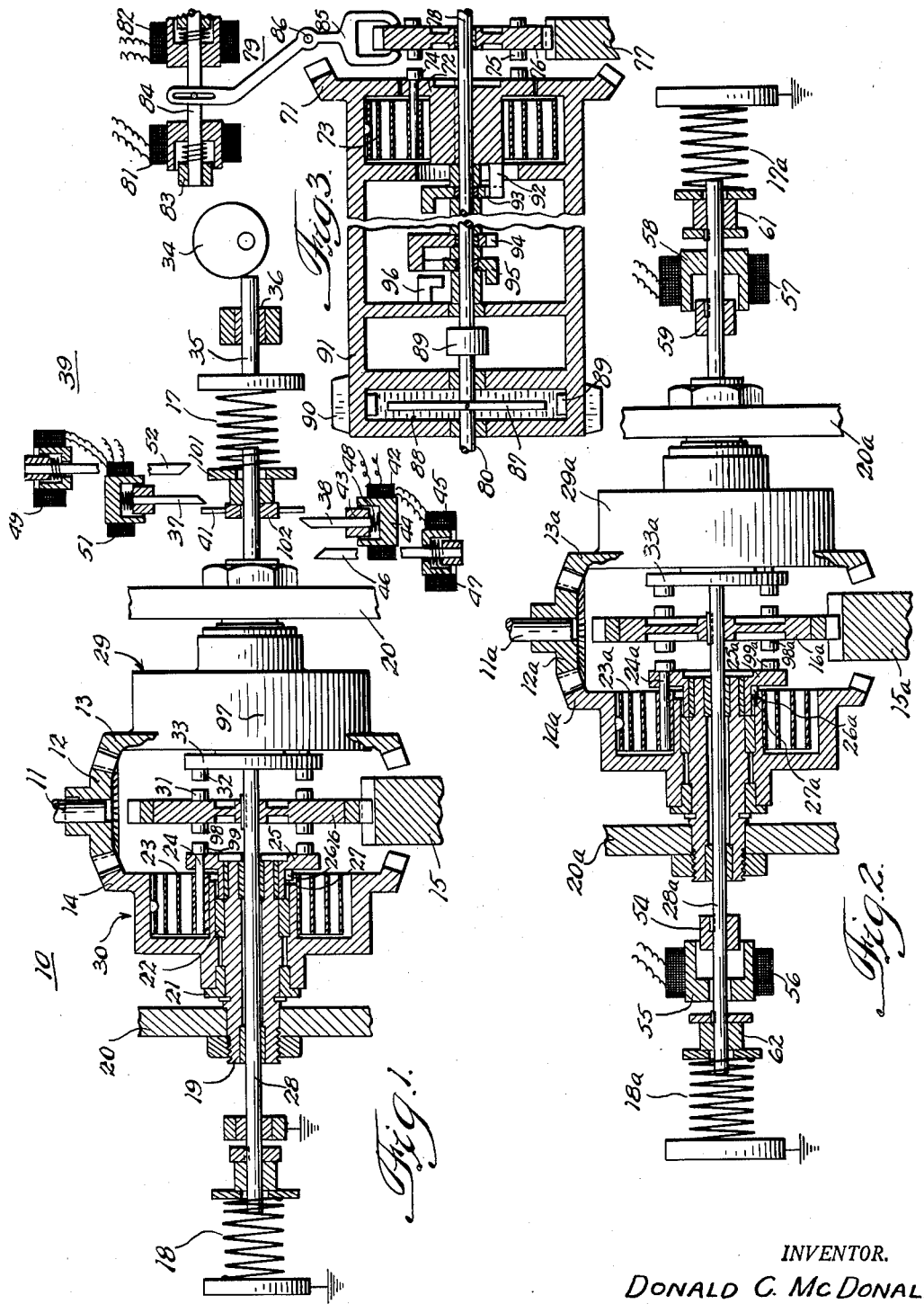

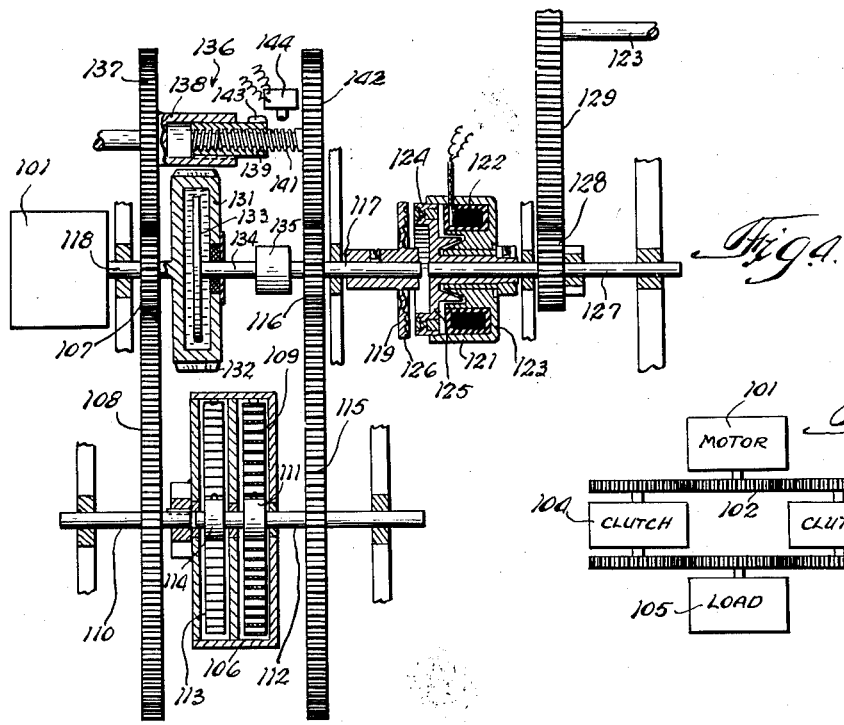

2,722,846

COUPLING APPARATUS HAVING PREDETERMINED TORQUE CHARACTERISTICS

Donald C. McDonald, Chicago, Ill., assignor to Cook Electric Company, Chicago, Ill., a corporation of Illinois Application December 6, 1952, Serial No. 324,488

19 Claims. (Cl. 74—355)

This invention relates to coupling apparatus and more particularly to torque coupling apparatus whereby a continuously rotating prime mover is adapted to drive a predetermined load with a known torque.

It is a principal object of this invention to provide apparatus whereby a load may be accelerated to any predetermined velocity by a known predetermined force.

It is a further object of this invention to provide a system whereby a predetermined approximately constant torque can be applied to a given load to produce either positive or negative accelerations of known magnitude.

All mechanical systems inherently possess some resiliency. Coupling devices and clutches in particular must possess either resiliency or a slippage characteristic, as these devices are generally used to suddenly apply a large torque to a load having relatively large inertia. If the system were completely rigid, the impact of the sudden clutch engagement would produce large fatigue stresses within the materials of which the clutch was constructed, and would ultimately result in complete failure. Thus all coupling systems and associated links, shafts and gears, of necessity, possess an elastic characteristic, and usually this characteristic is of such a variable nature that it is impossible, during the acceleration of the load, to predict the exact position or velocity of the load at any given time. Most of the strains which are produced in the normal clutch mechanism and associated coupling apparatus are of a nonlinear character. That is, the exact magnitude of such strains are not readily predictable by any mathematical analysis, nor are they constant at various accelerations and velocities. These strains, and the rate of change of the strains, will determine the actual output torque of any given system at any time.

It is often desirable to be able to predict the exact angular position and velocity of a load having a known inertia under a known acceleration. This is especially true in follow-up systems in which it is desired to control the position and velocity of a large mass by coupling a powerful prime mover to such a load to drive it in a predetermined pattern. The computing and controlling portions of such a follow-up system must determine the time for torque reversal to insure accurate positional control of the load with respect to the controlling element. In such systems it is a prime requirement that the computing portions have a continuous and accurate indication of the exact position and velocity of the load in order that said computers can generate an error voltage which will bring said load into both positional and velocity agreement with the signaling element coincidentally.

Therefore, it is a further object of this invention to provide a coupling mechanism transmitting a known torque which is especially adapted for use in follow-up systems, of compact design and of relatively low mass compared to the load to be driven.

It is an additional object of this invention to provide coupling apparatus for producing a known torque which is extremely fast acting and capable of rapid torque reversal.

It is another object of this invention to provide apparatus having torque characteristics whereby the position and velocity of the coupled load will be at all times determinable.

Additional objects of this invention will be manifest from the description, accompanying drawings and appended claims.

One form which this invention may assume includes a constant speed continuously rotating prime mover adapted to drive two coaxial bevel gears in counter-rotation. These gears are resiliently connected to respective coupling faces, also coaxial and counter-rotating. Between these coupling faces an axially shiftable spur gear is mounted which is adapted to drive the load through an appropriate gearing system. Upon shifting this spur gear axially it will engage one of the counter-rotating coupling faces in positive relation whereby the spur gear and coupled face will quickly assume a common velocity. This will cause relative rotation between the coupled face and its associated bevel gear and results in the storage of a quanta of energy in the resilient member therebetween. The resilient member in this embodiment may be a spiral, torsion, cantilever or helical spring that is capable of allowing several revolutions of the coupling face with respect to the bevel gear while exhibiting no substantial change in the torque applied to the coupling face. The torque transmitted by this spring will be somewhat less than the maximum torque capabilities of the system, but may exceed the maximum recommended continuous torque of the prime mover so that the spring is continuously wound during driving engagement as a result of short duty cycle motor overload on the inertia of the system. An electromagnetic device is utilized to shift the output spur gear from its normal neutral position into engagement with one of the counter-rotating coupling faces. This electromagnetic control is especially applicable to the on-off mode of servomechanism operation but is not limited to such applications and may be utilized wherever it is desired to control a large torque by a small signal voltage.

For a more complete understanding of this invention reference should now be made to the drawings, wherein:

Figure 1 is a front elevation, partially in section, of one preferred embodiment of this invention;

Fig. 2 is an illustration, partially in section, of a second embodiment of this invention;

Fig. 3 is an illustration of a portion of a constant torque clutch mechanism showing the use of an energy dissipating device adapted to protect the frangible stops and abutments of the system;

Fig. 4 illustrates a third embodiment, partially in section, which utilizes an improved resilient stop mechanism;

Fig. 5 illustrates another embodiment, using a resilient stop mechanism in which all elements are mounted coaxially; and Fig. 6 is a block diagram illustrating two coupling devices adapted to drive a single load in either direction of rotation.

Referring now to the drawings, and more particularly to Fig. 1, a bidirectional coupling mechanism 10 is shown having a rotating input shaft 11, a rotatable output gear 15, partially broken away, two identical torque couplings 29 and 30, and a coupling control 39 capable of positioning the clutch elements for positive rotation, negative rotation or quiescence. Shaft 11 is the output shaft of a continuously rotating prime mover such as an A. C. induction member chosen to have an average torque determined by the moment of inertia of the load and motor and the desired acceleration of said load. Secured to shaft 11 is a bevel gear 12 which is in engagement with two counter-rotating coaxial bevel gears 13 and 14. In the normal quiescent state, these counter-rotating bevel gears will be free of any load as the spur gear 16 which is coupled to the output gear 15 and fixed to the axially movable shaft 28 is centrally located within the clutch chamber and is maintained in that position by the opposed compressed springs 17 and 18. Upon shifting spur gear 16 axially, it will positively engage one of the two counter-rotating coupling mechanisms is will be subsequently explained in greater detail.

The constant torque couplings 29 and 30 are identical in structure and function, differing only in the direction of rotation, and it is believed that a description of coupling 30, which is here shown in section, will convey an adequate understanding of the operation of both. The bevel gear 14 is rotatably mounted on appropriate journal bearings 21 and 22 on the fixed collar 19 secured in housing 20. A flat sprial power spring 23 has one of its ends secured to the bevel gear 14 and its other end secured to pin 24 which is fixed to a coupling face 25. Coupling face 25 is also mounted for rotation on the collar 19 and is relatively rotatable with respect to the bevel gear 14.

In the normal disengaged condition, coupling face 25 will be rotating at the same speed as the bevel gear 14 and will be exerting no torque upon the spring member 23. As such a spring member in its unflexed condition would exhibit an undesirable nonlinear torque characteristic, it is desired that the spring be pretensioned and maintained in such a tensioned condition at all times. This pretensioning is provided by rotating coupling face 25 with respect to bevel gear 14 opposite the direction of rotation of bevel gear 14. This pretensioning will be maintained by a stop 26 which is integral with the coupling face 25 and which will normally ride within a discontinuous groove 27 in the bevel gear 14. There will be a stop position within the groove 27 which will prevent more than one revolution of the coupling face 25 with respect to the bevel gear 14 and will prevent rotation of face 25 which would result from the pretensioning of spring 23. Spur gear 16 is keyed to shaft 28 which is rotatably mounted in collar 19 and is axially shiftable to produce positive engagement of the dogs 98 of spur gear 16 with the dogs 99 of coupling face 25.

While the dogs 98 and 99 are here used to provide positive engagement of the corresponding clutch faces, various alternative engaging faces may be employed without departing from the spirit of this invention. For example, ratchet type faces or friction clutch plates may be employed. Such clutch plates would reduce the strains resulting from the initial impact of engagement but would still provide positive torque transmission after a short transient time during which the clutch faces engage.

The second coupling mechanism 29, identical to that just explained, is driven by bevel gear 13 in a direction opposite that of coupling 30 and is contained within housing 97. Thus if spur gear 16 is axially shifted in the opposite direction the dogs 31 of the spur gear 16 will engage dogs 32 on the counter-rotating coupling face 33 to produce positive engagement of the coupling face 33 with the spur gear 16.

One possible control mechanism 39 for positioning the spur gear 16 is here shown. It consists of a continuously rotating cam 34 preferably driven by the prime mover which is also driving the shaft 11. This will produce an oscillatory motion of shaft 35 within the bearing 36 and will produce oscillatory compressions and extensions of spring 17. The other end of coil spring 17 engages a nonrotating face plate 101 and will apply axial pressure to member 102 which is fixed on shaft 28. This would normally result in an oscillatory motion of the shaft 28 and spur gear 16, but such oscillatory motion is prevented by the stop pins 37 and 38 which are a part of the clutch control 39. These pins are normally engaging a control disc 41 fixed on shaft 28 so that axial movement is prevented. When it is desired to have the spur gear 16 engage either of the coupling faces 25 or 33 an appropriate solenoid is energized. If it is desired that spur gear 16 engage coupling face 25, solenoid 42 would be energized, which would cause a magnetic field to be created and would result in armature 43 being drawn into core 44. This would retract pin 38 and upon the next rotation of cam 34 the compressed spring 17 would cause axial movement of the shaft 28 and positive engagement of the dogs of spur gear 16 with the dogs of the coupling face 25. When solenoid 42 is energized to retract pin 38, solenoid 45 is also energized, which will cause the extension of pin 46. This pin will engage disc 41 to maintain the axially shifted position of shaft 28 and consequently will maintain engagement of the coupling face 25 with the spur gear 16. When it is desired to disengage the clutch, deenergization of solenoids 42 and 45 will cause pin 46 to retract once again under the influence of spring 47 and pin 38 to be extended by spring 48. When the pins are in this position the spring 18, which is now compressed, will cause shaft 28 to return to its normal position, which is between the pins 37 and 38, and the clutch mechanism will once again be disengaged.

When it is desired to drive the output gear 15 in the opposite direction, solenoids 49 and 51 are energized through an appropriate circuit, and this will cause the retraction of pin 37 by solenoid 51 and the extension of pin 52 by solenoid 49. When the cam 34 has rotated to an appropriate position, spring 18 will cause shaft 28 to shift to a position where the dogs 31 of spur 16 will engage the dogs 32 of coupling face 33, and at that time disc 41 will be positioned behind extended pin 52 to maintain actuation of the clutch mechanism. This type of operation is especially useful in servomechanisms in which it is desired to apply a positive predetermined torque for a known time to produce a predetermined positive acceleration, and then to suddenly reverse the applied torque to produce a known negative acceleration of the load. In such a system when a predetermined error exists between a signaling element and the load, a voltage will automatically be applied to the solenoids 42 and 45. This will cause engagement of the spur gear 16 with the coupling face 25 to cause an acceleration of the output which will be determined solely by the inertia of the output load and the torque characteristics of the resilient spiral member 23. As both torque and moment of inertia are known, acceleration is known, and the exact instant of desired torque reversal can be calculated by a computer which will automatically deenergize the solenoids 42 and 45 and apply a voltage to the solenoids 49 and 51. This will cause an axial shift of the shaft 28, and while the load will have a positive velocity of known magnitude imparted by the coupling through the mechanism 30, the spur gear 16 will shift and engage the coupling face 33 to produce a negative torque tending to reverse the direction of rotation of the load. The coupling faces 25 and 33 are of low mass and have low spring rates so that, upon engagement with the spur gear 16, they will quickly assume the velocity of the spur gear 16 without producing undue strain on the dogs 32, 33 or 98, 99.

The choice of material and dimensions for the power springs 23 are determinable from certain known physical characteristics. As the maximum relative rotation of the coupling face 25 with respect to the bevel gear 14 is somewhat less than 360°, and as the load which is to be driven is of some known mass having a known moment of inertia, it has been found that the maximum energy which must be stored in the spring 23 can be calculated from the equation $E_c = 2J_0W_0^2$, where $E_c$ is the energy stored in the spring member, $J_0$ is the moment of inertia of the load, and $W_0$ is the maximum velocity of the load. This energy will be stored in the spring by the rotation of the spring through an angle A against the constant spring torque $T_c$, $E_c = T_cA$, and will thus define the exact physical character of spring 23. It must exihibit the desired torque Tc and be capable of rotation through the desired angle A without exceeding the elastic limit of the spring material. The torque Tc of the spiral spring 23 must be somewhat less than the torque deliverable from any of the coupling members, gears, and other elements of the system. The maximum motor torque is not, however, necessarily controlled by this equation, but is also a function of the inertia of the system.

The embodiment shown in Fig. 2 operates in a manner similar to that of Fig. 1 and is especially useful in systems requiring less rapid torque reversal. Here the input shaft 11a is again driving the bevel gear 12a, with counter-rotating coaxial bevel gears 13a and 14a driven thereby. Resilient member 23a again has one of its ends attached to the bevel gear 14a and terminates in pin 24a which is fixed within the coupling face 25a. Spur gear 16a has dogs 98a adapted to positively engage associated dogs 99a on the coupling face to form a positive connection therebetween. Spur gear 16a in turn drives the output load through a coupled gear 15a. This embodiment differs in the manner in which shaft 28a is shiftable into engagement with either of the associated coupling faces 25a and 33a. In this embodiment, the spur gear 16a is maintained in a central position between the coupling faces by springs 17a and 18a which are under equal compression. Fixed to the shaft 28a is a solenoid armature 54, which is adapted for motion into a solenoid core 55 within the coil 56. Upon energizing the coil 56, the armature 54 is drawn into the core 55, producing axial motion of the shaft 28a, and this results in engagement of spur gear 16a with coupling face 25a.

When torque reversal is desired, solenoid 56 is de-energized and a second solenoid 57 is energized. This solenoid has a core member 58 associated therewith and an iron armature 59 adapted for motion relative thereto and secured to the shaft 28a. The armature 59 will be attracted by the energized solenoid and will cause shaft 28a and spur gear 16a to shift into engagement with the counter-rotating coupling face 33a. Shaft 28a is rotatably mounted in journal bearings 61 and 62, so that the springs 17a and 18a can apply a lateral force, causing axial shift of shaft 28a, but are not required to rotate with the shaft 28a.

The stresses which are created in the various portions of these coupling devices will never substantially exceed the torque which is pretensioned in the power spring members 23 upon engagement of the coupling faces, provided the coupling faces have relatively low mass. However, upon disengagement of the coupling face 25 all of the energy which has been stored in the spring member 23 will be suddenly released and will cause a rapid acceleration and counter-rotation of coupling face 25 with respect to the bevel gear 14. All of this kinetic energy must be absorbed by the pin 26 engaging the abutment of groove 27 in the bevel gear 14 and will quickly cause fatigue and failure of the pin. This can be avoided by providing, within the clutch housing, a system for energy dissipation of the stored energy of the spring member 23. In Fig. 3 such an energy dissipation system is illustrated. The system of Fig. 3 includes a bevel gear 71 which is the equivalent of gear 14 of Fig. 1 and is continuously driven by an input member not here shown. The bevel gear 71 drives a coupling face 72 through the spring member 73. Coupling face 72 has a pair of engaging dogs 74 which are adapted to contact dogs 75 on the spur gear 76 to drive an appropriate load which is driven by output gear 77. In this embodiment the spur gear 76 is free to axially move on the shaft 78, and engagement of the spur gear with the coupling face 72, or a corresponding coupling face for counter-rotation which is not here shown, is effected by the mechanism 79.

The control mechanism 79 includes a U-control 85 which will shift the spur gear 76 and which is controlled by a pair of solenoids 81 and 82. To effect engagement of the spur gear 76 with the coupling face 72, solenoid 81 is energized, causing the armature 83 to be attracted thereto, which would produce a lateral motion of shaft 84 to the right. This would cause a rotation of the U-control 85 about its axis 86 and cause the engagement of spur gear 76 with coupling face 72. In a like manner, the energization of solenoid 82 would cause shaft 84 to move to the left, causing a counterclockwise rotation of the U-control 85 about its axis 86 and would effect engagement of the spur gear 76 with the counter-rotating coupling face which is not here shown.

Shaft 78 is keyed to coupling face 72 for rotation therewith. A rotor 87 is fixed to a shaft 80 for rotation therewith and is suspended within a fluid-filled chamber 88. Between the coupling face 72 and the disc 87, that is, connecting shafts 78 and 80, is a one-way clutch 89 adapted to cause rotation of disc 87 upon the disengagement of the spur gear 76 and the coupling face 72, at which time shaft 78 is accelerated by the energy stored in spring 73 to a velocity in excess of shaft 80. Thus upon engagement a certain relative rotation of coupling face 72 will occur with respect to bevel gear 71 and housing 91. This will not cause a rotation of the disc 87 within the housing 91 as the one-way clutch 89 will be disengaged. However, when the coupling face 72 is disengaged from spur gear 76, there will be a relative counter-rotation of coupling face 72, and this will cause the engagement of one-way clutch 89, and the energy stored in the spring 73 will be dissipated in the form of kinetic energy in the motion of disc 87 and heat generated in the fluid within housing 88. This will prevent the spring member 73 from unwinding at a high velocity and causing fatigue and failure of the stop mechanism associated therewith. The heat is more readily dissipated from the fluid within the housing 88 by providing dissipating fins 90 on the periphery thereof.

An additional feature in the embodiment of Fig. 3 is a unique stop mechanism which will allow greater rotation of the coupling face 72 with respect to the bevel gear 71. This stop mechanism consists of a plurality of levers adapted to sequentially engage one another to provide relative rotation of the coupling face and bevel gear in excess of 360°. The magnitude of rotation is limited only by the number of levers provided. As shown in Fig. 3, rotation of the coupling face 72 will cause its associated dog 92 to engage lever 93. This engagement will cause lever 93 to rotate until it engages a subsequent lever 94. Fig. 3 is shown broken at this point to indicate that any number of levers could here be inserted. If the number were three, as shown here, lever 93 would then engage the associated lever 94 for a second rotation of approximately 360°, at which time lever 94 would in turn engage lever 95 and cause it also to rotate. Lever 95 would then engage stop pin 96, which would be the limit of rotation of the coupling face 72 with respect to the bevel gear 71 and integral housing 91. The known maximum load velocity and total angular displacement available will determine the exact character of the spring 73 which is utilized, and by the proper choice thereof, as explained above, the entire available travel afforded by this stop system should never be completely exhaused. If the total angular travel is utilized, the stop linkage will, of course, provide a positive mechanical connection between the driving and driven elements and will thus exhibit all the characteristics of a standard clutch mechanism in which no attempt is made to produce a known and predictable torque output.

In the precise controls required in servomechanism applications it would also be desirable to insert within the fluid enclosure a thermostatic temperature controlling device 89. This would be especially desirable in aircraft applications where extreme changes in ambient temperature are encountered, and as the viscosity of most damping fluids varies substantially with temperature change, this would produce undesirable variations in the energy dissipation available per revolution of disc 87.

The structure disclosed in Fig. 4 is a third embodiment of this invention in which the stop mechanism is of a resilient nature whereby the various fatiguing forces which would be inherent in a structure having positive stops are eliminated. Again, the coupling apparatus shown in Fig. 4 is a bidirectional system, although the portions herein shown are utilized only in driving a load in one direction. The block diagram in Fig. 6 shows the manner in which a single prime mover 101 is geared through the gear train 102 to counter-rotate two identical clutch mechanisms 103 and 104, which will be alternately actuated to drive the load 105 for acceleration in opposite directions.

In Fig. 4 the motor 101 is shown driving a spring housing 106 through spur gears 107 and 108. Secured to the spring housing 106 is one end of a spirally wound power spring 109 having a predetermined torque characteristic and having its other end secured to a collar 111 which is, in turn, mounted on a shaft 112. Thus the energy of the motor 101 is transmitted to the shaft 112 through the spring 109 and the maximum torque which can be thus transmitted is determined by the physical dimensions and material of the power spring 109. As described above, by the proper choice of this spring a predictable torque characteristic is available at the output of this mechanism whereby the position of a load being driven by the output will always be known or predictable. A spirally wound spring, unless pretensioned, exhibits a rapidly changing torque characteristic for initial applications of rotational force. Therefore, a predetermined number of pretensioning turns are maintained in the spiral spring 109 at all times. This pretensioning is insured by a second resilient spiral member 113 also having one end secured to the spring housing 106 and its other end secured to a collar 114 mounted on the shaft 112. While this stop spring 113 is made of a material having good tensile characteristics, its dimensions are such that its torque transmission is relatively small. Furthermore, spring 113 is wound in a direction opposite that of the direction of winding of spring 109, whereby as spring 109 tends to unwind, spring 113 is wound tightly about the collar 114. By having a predetermined number of convolutions on the stop spring 113 which is less than the number of convolutions of the spring 109, as the spring 109 unwinds the spring 113 will be tightly wound on the collar 114, and the portion of spring 113 adacent the spring housing 106 will be under a substantially pure tensile stress. This will cause the relative motion of the sshaft 112 and the spring housing 106 to be stopped with a predetermined number of pretensioning convolutions remaining in the spring 109.

The shaft 112 has a spur gear 115 mounted thereon. Spur gear 115 is in turn in engagement with gear 116 mounted on shaft 117 which is coaxial with the shaft 118 of the motor 101. The shaft 117 has secured thereto a diaphragm 119, the periphery of which is axially movable to engage an electromagnetic clutch 121. The electromagnetic clutch 121 has a coil 122 which is wound on a fixed core 123 and which is energized when it is desired to transmit torque from the motor 101 through the torque transmitting spring 109 to an output load connected to the shaft 123. When the coil 122 is energized, a magnetic path which includes the fixed core 123, rotating cores 124 and 125, and magnetic clutch plate 126 is energized whereby the clutch plate 126 mounted on the diaphragm 119 is drawn into engagement with the rotatable core members 124 and 125. When thus energized, torque will be transmitted from the diaphragm 119 to the rotatable core members 124 and 125 which are secured to a rotatable output shaft 127. Shaft 127 is adapted to drive the shaft 123 through spur gears 128 and 129. There will be a transient period during which the magnetic clutch 121, or any friction engagement clutch which might be substituted therefor, will exhibit slippage and nonlinear torque characteristics. This transient period will be extremely short, however, and will thus not substantially affect the predictable character of the torque transmitted. The friction type clutch must be so chosen that it is capable of transmitting torques substantially in excess of the torque transmitted by the spiral spring 109.

As described above with respect to Fig. 3, when the clutch 121 is disengaged the energy stored in the spring 109 must be suddenly dissipated as the load has been removed from the system and the shaft 112 is free to recoil under the tension of spring 109. If this energy is allowed to dissipate against fixed stops, large fatiguing forces are established which will cause failure of the apparatus quickly. To prevent this, an energy dissipating means is provided which consists of a fluid filled housing 131 which is rotatably driven by the motor 101. Contained within the housing 131 is any of the common viscous fluids adapted for energy damping, and mounted on the periphery of the housing 131 are a series of fins 132 adapted for heat dissipation. Rotatably mounted within the housing 131 is a disc 133 which is fixed to a shaft 134. The shaft 134 is coaxial with shaft 117 and connected thereto through a one-way clutch 135. Any one of various clutches known in the art may here be utilized. The purpose of the one-way clutch is to disengage the energy dissipating system when the motor 101 is applying torque to the load through the actuated clutch mechanism 121, but upon deenergization of the clutch 121 relative rotation of the shafts 117 and 118 is reversed, and to prevent the very rapid unwinding of the power spring 109 the one-way clutch 135 is engaged to relatively rotate the fluid housing 131 and rotatable disc 133.

To prevent damage to the spring 109 which would result from the application of a winding force over a period of time such that the spring 109 would be strained beyond its elastic limit, a switch apparatus 136 is provided to deenergize the solenoid 122 of the magnetic clutch 121 whenever a predetermined number of relative rotations of the shaft 112 and housing 106 has been measured. The switch mechanism 136 consists of a spur gear 137 driven directly from the spur gear 107 which is in turn driven by the prime mover 101. Mounted on the spur gear 137 is a hollow shaft 138 having a keyway axially formed on the internal surface thereof. A bushing 139 is received within the hollow shaft 138 and engages the keyway therein. Bushing 139 has a lead screw cut on its internal surface for engagement by the worm 141. Worm 141 is fixed to a spur gear 142 which is driven by the spur gear 116 fixed to shaft 117.

By the apparatus above described any relative rotation of the motor 101 with respect to the diaphragm 119 will result in axial motion of the bushing 139 between the spur gears 137 and 142. This relative rotation is in fact winding the spring 109. The bushing 139 has a contact 143 secured thereto which is adapted to engage a switch 144 whenever a predetermined number of relative rotations of input and output have been measured. The switch 144 will automatically deenergize the coil 122, thus releasing clutch 121, allowing recoil, and preventing any excessive stresses from being imposed upon the power spring 109. As indicated above with respect to Fig. 6, this apparatus is adapted for accelerating a known load in a given direction whereby the torque which is applied to the load is always known, and therefore the position of the load can be readily determined. Identical apparatus would be provided for accelerating said load in the opposite direction, and this apparatus would be driven from the same motor 101 and would rotate the shaft 123 by engagement with the spur gear 129. Among other uses such a clutch provides revolutionary advancement in the servomechanism art, in which it is now possible to accurately control and position an output load still utilizing the full power available from a prime mover. Thus many of the advantages of continuous control are combined with the advantages of contactor or on-off mode of servo operation.

The structure shown in Fig. 5 is similar to that shown in Fig. 4 in that it also utilizes a resilient stop member to prevent fatiguing forces upon any of the abutting surfaces. Here the motor, not shown, drives shaft 151 which is geared through spur gear 171 to the spring housing 152. Secured to the inner periphery of the housing 152 is one end of a spring member 153 capable of transmitting a known torque and one end of a resilient spirally wound stop 154 having a very small torque characteristic but having high tensile strength. The spring 153 and stop 154 are secured to collars 155 and 156 mounted on a shaft 157 as described above with respect to Fig. 4. Also contained within the housing 152 is a fluid chamber 158 which is used for energy damping when the coupling apparatus is disengaged. A diaphragm 177 having magnetic clutch plate 159 secured thereto is keyed to the shaft 157 and adapted to engage the rotatable portions 161 of a magnetic clutch 162. The structure and operation of this clutch is described above. The rotatable portions 161 of the clutch are fixed to a shaft 163 which, through appropriate gearing 164, is adapted to drive the shaft 165 secured to the load. When the clutch 162 is deenergized the diaphragm 177 returns to a normal position in which a clutch plate 166 secured to the diaphragm is adapted to engage a clutch plate 170 secured to the external portions 167 of a damping disc 168. The damping disc 168 is rotatably mounted within the housing 152 on bearings 160 and is surrounded by a viscous fluid in the chamber 158. By this arrangement the one-way clutch utilized in Fig. 4 is eliminated. Upon deenergization of the clutch 162 the clutch plate 166 on the diaphragm 177 engages plate 170 and causes relative rotation of the damping disc 168 and the housing 152, whereby the stored energy of the spring 153 is dissipated in the viscous fluid 158 in the form of heat. An over-travel switch 169 is again provided which functions in the same manner as that described above with respect to Fig. 4. The switch includes spur gear 171 which is driven by the input shaft 151 and spur gear 172 whose rotation is determined by the winding effect upon the spring 153 and is driven by the shaft 157. Whenever there is relative rotation between the spur gears 171 and 172 the worm 173 causes bushing 174 to move axially as rotation of bushing 174 is prevented by the keyway in the hollow shaft 175. Upon a predetermined number of relative rotations of spur gears 171 and 172, and consequently upon a predetermined winding of the spring 153, the bushing 174 engages switch 176 which deenergizes the magnetic clutch 162, removing the load from the prime mover and allowing the spring 153 to unwind, dissipating the energy stored in the wound spring in the viscous fluid 158. The switch mechanism here shown is merely exemplary of the principle involved and illustrative of one possible means of preventing strain in the torque spring 109. Various devices may be substituted therefor without departing from the invention. For example, a second stop spring similar to spring 113 but wound in the same direction as spring 109 may be utilized to stop the further winding of the power spring 109 at a predetermined number of revolutions.

Again, while only one coupling apparatus is here shown, it should be clear that in any application requiring bidirectional acceleration it will be desired to provide two such coupling systems geared to a common shaft from a common prime mover, whereby the load may be accelerated and decelerated alternately.

The disclosure of Fig. 4 has certain mechanical advantages over that of Fig. 5, in that various gear ratios may be chosen for the spur gears 107, 108 and 115, 116, whereby a stiffer spring 109 may be utilized to transmit the same torque and store the same energy which otherwise would require a much larger spring and consequently apparatus of greater size. Likewise, if desired the energy dissipating portion of this apparatus may be driven at a higher speed by appropriate gearing whereby the same degree of energy dissipation may be obtained with a smaller disc and housing and a smaller quantity of viscous fluid.

Many possible combinations and variations immediately will appear from the teaching of this disclosure. While a disc is shown as the moving element in the fluid dampers of Figs. 3, 4, and 5, any moving element, such as a vaned rotor, may be utilized to achieve the desired mechanical drag. In a like manner, while the electromagnetic clutches utilized in the structure of Figs. 4 and 5 have a flexible diaphragm engaging member, it should be clear that a sliding splined clutch plate could be employed.

Various other obvious mechanical combinations and modifications will be apparent to one skilled in the art whereby economy of size and material may be effected, and such modifications are clearly within the spirit and scope of this invention.

A coupling system is thus taught which is capable of providing predetermined torque to a load of known inertia for driving said load in either a positive or negative direction, and this produces a system in which it is possible to accurately determine at all times the exact position, velocity, and acceleration characteristics of the load. This is desirable in many fields of industry, but is especially sought in the field of closed cycle control mechanisms where accurate positional control is absolutely necessary to the satisfactory functioning of the apparatus.

The clutch of this invention, in addition to producing predetermined torque and consequently known accelerations and predicable velocities and positions, is also useful where it is desirable to limit the stresses on machine parts to a predetermined value. An example of this is in the plugging operation of machine tools, such as lathes and screw machines, where it is necessary to stop and start the chuck in the minimum possible time without damaging the machine, thus producing maximum output per machine hour.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. Coupling apparatus exhibiting predetermined torque characteristics comprising a rotatable driving member, a rotatable coupling face, resilient means drivingly connecting said coupling face and said driving member, means for maintaining a predetermined minimum tension in said resilient means to produce a predetermined torque on said coupling face while allowing relative rotation of said driving means and said coupling face, and rotatable output means coaxial with said coupling face and axially shiftable to engage said coupling face.

2. Coupling apparatus exhibiting predetermined torque characteristics comprising a rotatable driving member, a rotatable coupling face, resilient means drivingly connecting said coupling face and said driving member, means for maintaining a predetermined minimum tension in said resilient means to produce a predetermined torque on said coupling face while allowing relative rotation of said driving means and said coupling face, rotatable output means coaxial with said coupling face and axially shiftable to engage said coupling face, energy damping means rotatable with said coupling face to absorb the energy stored in said resilient means during driving engagement of said coupling face and said output means upon disengagement thereof, and unidirectional clutch means connecting said damping means to said coupling face.

3. Coupling apparatus exhibiting predetermined torque characteristics comprising a rotatable driving member, a rotatable coupling face, resilient means drivingly connecting said coupling face and said driving member, rotatable output means shiftable to engage said coupling face, energy absorbing means to absorb the energy of said resilient means, and coupling means to engage said absorbing means with said coupling face upon disengagement of said output means from said coupling face.

4. Coupling apparatus exhibiting predetermined torque characteristics comprising a rotatable driving member, a rotatable coupling face, resilient means drivingly connecting said coupling face and said driving member, rotatable output means shiftable to engage said coupling face, electromagnetic means to effect the shifting of said output means, energy absorbing means to absorb the energy of said resilient means, and coupling means to engage said absorbing means with said coupling face upon disengagement of said output means from said coupling face.

5. Coupling apparatus exhibiting predetermined torque characterstics comprising a rotatable driving member, a rotatable coupling face, resilient means drivingly connecting said coupling face and said driving member, rotatable output means axially shiftable relative to said coupling face to engage said coupling face, resilient means to normally maintain said output means disengaged from said coupling face, and electromagnetic control means to effect engagement of said output means and said coupling face comprising two attractable magnetic elements mounted coaxially with said output means, one of said elements being fixed thereto.

6. Coupling apparatus exhibiting predetermined torque characteristics comprising a rotatable driving member, a rotatable coupling face, resilient means drivingly connecting said coupling face and said driving member, rotatable output means axially shiftable to engage said coupling face, continuously rotatable cam means resiliently engaging said output means to apply oscillating axial forces thereon, and movable control members to engage said output member and determine the axial position thereof.

7. Coupling apparatus exhibiting predetermined torque characteristics comprising two counter-rotatable driving members, a coupling face associated with each of said driving members, a resilient means drivingly connecting each of said coupling faces with the associated driving member, rotatable output means shiftable to engage either of said coupling faces, continuously rotatable cam means resiliently engaging said output means to apply oscillating axial forces thereon, and retractable control members to engage said output means and determine the axial position thereof.

8. Coupling apparatus as defined in claim 4 in which said resilient means comprises a metallic spring member having a spiral shape.

9. Coupling apparatus as defined in claim 4 in which said resilient means are shaped whereby said predetermined torque is substantially constant.

10. Coupling apparatus exhibiting predetermined torque characteristics comprising a rotatable driving member, a rotatable coupling face, resilient means drivingly connecting said coupling face and said driving member pretensioned to produce a predetermined torque on said coupling face while allowing relative rotation of said driving means and said coupling face, rotatable output means coaxial with said coupling face and axially shiftable relative to said coupling face to engage said coupling face, energy damping means rotatable with said coupling face to absorb the energy stored in said resilient means during driving engagement of said coupling face and said output means, coupling means to engage said damping means and said coupling face upon disengagement of the coupling face, and control means to axially move said output member to engage said coupling face at such times as it is desired to apply such a predetermined torque to said output member.

11. Coupling apparatus exhibiting predetermined torque characteristics for driving a predetermined load comprising a rotatable driving member, a rotatable coupling face, rotatable output means coaxial with said coupling face and axially shiftable to drivingly engage said coupling face, resilient means drivingly connecting said coupling face and said driving member and pretensioned to produce a known torque the magnitude of which is determined by a load to be driven and the allowable relative rotation of said driving member and said coupling face, energy damping means to absorb the energy stored in said resilient means automatically upon the disengagement of said driving member and said coupling face, and control means to affect engagement of said coupling face and said output means.

12. Coupling apparatus exhibiting predetermined torque characteristics for driving a known load comprising a rotatable driving member, a rotatable driven member coaxially mounted with respect to said driving member, resilient means drivingly connecting said driving member and said driven member, said resilient means being capable of transmitting a known torque from said driving member to said driven member for a predetermined number of relative rotations of said members, stop means to maintain a predetermined tension in said resilient means at all times, and engageable clutch means to couple said driven member to such a load.

13. Coupling apparatus exhibiting predetermined torque characteristics for driving a known load comprising a rotatable driving member, a rotatable driven member coaxially mounted with respect to said driving member, resilient means drivingly connecting said driving member and said driven member, said resilient means being capable of transmitting a known torque from said driving member to said driven member for a predetermined number of relative rotations of said members, stop means to maintain a predetermined tension in said resilient means at all times, engageable clutch means to couple said driven member to such a load, and control means to effect disengagement of said clutch means whenever said predetermined number of relative rotations is exceeded.

14. Coupling apparatus exhibiting predetermined torque characteristics for driving a known load comprising a rotatable driving member, a rotatable driven member coaxially mounted with respect to said driving member, resilient means drivingly connecting said driving member and said driven member, said resilient means being capable of transmitting a known torque from said driving member to said driven member for a predetermined number of relative rotations of said members, stop means to maintain a predetermined tension in said resilient means at all times, engageable clutch means to couple said driven member to such a load, energy dissipating means engageable by said clutch means whenever said load is not being driven, and control means to effect disengagement of said clutch means whenever said predetermined number of relative rotations is exceeded.

15. Coupling apparatus exhibiting predetermined torque characteristics for driving a known load comprising a rotatable driving member, a rotatable driven member coaxially mounted with respect to said driving member, resilient means drivingly connecting said driving member and said driven member, said resilient means comprising a spirally wound metallic spring capable of transmitting a known torque from said driving member to said driven member, said resilient means being capable of transmitting said known torque for a predetermined number of relative rotations of said driving and driven members, and stop means to maintain a predetermined rotational relationship between said driving and driven members at all times whereby a known torque is transmitted.

16. Coupling apparatus exhibiting predetermined torque characteristics for driving a known load comprising a rotatable driving member, a rotatable driven member coaxially mounted with respect to said driving member, resilient means drivingly connecting said driving member and said driven member, said resilient means being capable of transmitting a known torque from said driving member to said driven member for a predetermined number of relative rotations of said members, stop means to maintain a predetermined tension in said resilient means at all times, electromagnetic frictionally engageable clutch means to couple said driven member to such a load, energy dissipating means engageable by said clutch means whenever said load is not being driven, and switch means to effect disengagement of said clutch means whenever said predetermined number of relative rotations is exceeded.

17. Coupling apparatus exhibiting predetermined torque characteristics for accelerating a known load comprising two counter-rotatable driving members, a coupling face associated with each of said driving members, a resilient means drivingly connecting each of said coupling faces with the associated driving member, each of said resilient means comprising a spirally wound metallic spring having known torque characteristics, a pair of counter-rotatable output means, one of said pair coaxially mounted with respect to each of said coupling faces and drivingly engageable therewith, electromagnetic means for effecting engagement of each of said coupling faces with the associated output means independently, said output means being in driving engagement with such a known load whereby the load may be selectively accelerated in either direction of rotation, switch means actuated by a predetermined rotation of one of said coupling faces relative to the associated driving means to control said electromagnetic means thus maintaining such relative rotation within a predetermined range, and energy damping means engageable by said coupling faces to dissipate the energy stored in said resilient means when one of said coupling faces and associated output means become disengaged.

18. Coupling apparatus exhibiting predetermined torque characteristics for accelerating a known load comprising two counter-rotatable driving members, a coupling face associated with each of said driving members, a resilient means drivingly connecting each of said coupling faces with the associated driving member, each of said resilient means comprising a spirally wound metallic spring having known torque characteristics, resilient stop means to insure a predetermined tension in each of said resilient means whereby the predetermined torque is maintained within a given range, a pair of counter-rotatable output means, one of said pair coaxially mounted with respect to each of said coupling faces and drivingly engageable therewith, electromagnetic means for effecting engagement of each of said coupling faces with the associated output means independently, said output means being in driving engagement with such a known load whereby the load may be selectively accelerated in either direction of rotation, switch means actuated by a predetermined rotation of one of said coupling faces relative to the associated driving means to control said electromagnetic means thus maintaining such relative rotation within a predetermined range, and energy damping means engageable by said coupling faces to dissipate the energy stored in said resilient means when one of said coupling faces and associated output means become disengaged.

19. Coupling apparatus exhibiting predetermined torque characteristics for accelerating a known load comprising two counter-rotatable driving members, a coupling face associated with each of said driving members, a resilient means drivingly connecting each of said coupling faces with the associated driving member, each of said resilient means comprising a spirally wound metallic spring having known torque characteristics, resilient stop means to insure a predetermined tension in each of said resilient means, each of said stop means comprising a resilient material spirally wound in a direction opposite that of said resilient means and secured between one of said driving members and the associated coupling face, said stop means being of a material having a lower elastic modulus and having fewer turns whereby the unwinding of said resilient member will cause said stop member to become tightly wound to prevent further relative rotation of said coupling face and said driving member thus producing a fixed tension in said resilient means.

References Cited in the file of this patent

UNITED STATES PATENTS

| | | |
|---|---|---|
| 1,205,968 | Blankenship | Nov. 28, 1916 |
| 1,346,078 | Couch | July 6, 1920 |
| 1,541,411 | Davis | June 9, 1925 |
| 1,541,748 | Davis | June 9, 1925 |
| 1,695,150 | Le Van | Dec. 11, 1928 |